(12) United States Patent
Stavila et al.

(10) Patent No.: US 11,192,783 B1
(45) Date of Patent: Dec. 7, 2021

(54) TERNARY BORIDES AND BOROHYDRIDES FOR HYDROGEN STORAGE AND METHOD OF SYNTHESIS

(71) Applicant: National Technology & Engineering Solutions of Sandia, LLC, Albuquerque, NM (US)

(72) Inventors: Vitalie Stavila, Pleasanton, CA (US); Leonard E. Klebanoff, Dublin, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 901 days.

(21) Appl. No.: 15/812,254

(22) Filed: Nov. 14, 2017

Related U.S. Application Data (60) Provisional application No. 62/516,776, filed on Jun. 8, 2017.

(51) Int. Cl.
| | |
|---|---|
| *C01B 3/00* | (2006.01) |
| *C01B 35/04* | (2006.01) |
| *C01B 6/21* | (2006.01) |
| *C01B 6/24* | (2006.01) |
| *C01B 6/23* | (2006.01) |

(52) U.S. Cl.
CPC .......... *C01B 3/0031* (2013.01); *C01B 3/0078* (2013.01); *C01B 3/0084* (2013.01); *C01B 6/21* (2013.01); *C01B 6/23* (2013.01); *C01B 6/24* (2013.01); *C01B 35/04* (2013.01)

(58) Field of Classification Search
CPC ........... C01B 3/0031; C01B 6/24; C01B 6/21; C01B 6/23; C01B 3/0084; C01B 3/0078; C01B 35/04
See application file for complete search history.

(56) References Cited

U.S. PATENT DOCUMENTS

2004/0105805 A1* 6/2004 Zidan .................... C01B 6/15
423/286

OTHER PUBLICATIONS

John Vajo "Boron-Based Hydrogen Storage: Ternary Borides and Beyond" Apr. 28, 2016, USDOE Office of Energy Efficiency and Renewable Energy, p. 1-51 (Year: 2016).*
Newhouse, et al., "Reversibility and Improved Hydrogen Release of Magnesium Borohydride", In Journal of Physical Chemistry C, vol. 114, 2010, pp. 5224-5232.
Ozolins, et al., "First-Principles Prediction of a Ground State Crystal Structure of Magnesium Borohydride", In Physical Review Letters, vol. 100, Apr. 2008, pp. 135501-1-135501-4.

(Continued)

*Primary Examiner* — Anthony J Zimmer
*Assistant Examiner* — Syed T Iqbal
(74) *Attorney, Agent, or Firm* — Medley, Behrens & Lewis, LLC (57) ABSTRACT

A method and a system is provided for obtaining solid-state hydrogen storage and release in materials with at least theoretical loaded hydrogen densities of 11 wt % or greater that can deliver hydrogen and be recharged at moderate temperatures enabling incorporation into hydrogen storage systems suitable for transportation applications. These materials comprise ternary boride materials comprising certain light transition metals and alkaline or alkaline earth metals, and ideally have no or very little phase separation. A process of making these materials is also provided.

10 Claims, 8 Drawing Sheets

(56) References Cited

OTHER PUBLICATIONS

Paskevicius, et al., "Metal Borohydrides and Derivatives—Synthesis, Structure and Properties", In Chem. Soc. Rev., Royal Society of Chemistry, vol. 46, 2017, pp. 1565-1634.
Vajo, et al., "Boron-Based Hydrogen Storage: Ternary Borides and Beyond", Project ID# ST117, Jun. 10, 2015, 21 pages.
Vajo, et al., "IV.C.8 Boron-Based Hydrogen Storage: Ternary Borides and Beyond", In FY 2015 Annual Progress Report, DOE Hydrogen and Fuel Cells Program, pp. IV-97-IV-100.

* cited by examiner

TERNARY BORIDES AND BOROHYDRIDES FOR HYDROGEN STORAGE AND METHOD OF SYNTHESIS

CROSS-REFERENCE TO RELATED APPLICATION

This application claims the benefit of priority of U.S. Provisional Patent Application Ser. No. 62/516,776, filed Jun. 8, 2017, and entitled "Ternary Borides and Borohydrides for Hydrogen Storage," the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

FIELD

This disclosure relates to energy storage materials, and more particularly to hydrogen energy storage.

BACKGROUND

Hydrogen-based energy storage systems are known and have been investigated as solutions for powering many technological developments including, in particular, electric vehicles. Hydrogen-based energy is particularly desirable because hydrogen gas reacts cleanly with air in a fuel cell, producing power with water as the only by-product. Such systems face challenges that have not, as of yet, found a suitable solution. Many hydrogen-based solid-state energy storage systems require very high temperatures and/or pressures to release hydrogen and also lose significant capacity as they operate through charging and discharging cycles. It would also be advantageous to improve the amount of hydrogen that can be stored and discharged, improve the process speed and temperature/pressure requirements of the discharge step.

Metal borohydrides show potential for hydrogen storage applications due to their high hydrogen content. Two main classes are anion-substituted compounds in which the $BH_4^-$ anion of the borohydride is replaced by another anion, such as a halide or amide ion; and metal borohydrides modified with neutral molecules such as $NH_3$ or other nitrogen containing compounds. Typically, in the hydrogenated state (outside of extreme operating conditions), such compositions comprise a metal amide and a metal hydride and in the dehydrogenated state, the materials of such compositions comprise a metal imide and a metal. Bulk metal amides have several drawbacks including limited cycle-life, occurrence of stable nonreactive imide species, and contamination of hydrogen with ammonia gas. Ammonia release irreversibly damages the hydrogen storage material since it removes nitrogen from the material, leading to reduced capacity. In addition, bulk metal-nitrides form as the end products and are known to be reluctant towards hydrogenation, adversely affecting the kinetics of the hydrogenation reaction needed for a fully cycling material.

Although contributing to the high hydrogen densities, the high valence of boron also leads to slow rates of hydrogen release and absorption (i.e. hydrogen exchange) due to extensive boron-boron atom rearrangements during hydrogen cycling. This rearrangement often leads to multiple solid phases occurring during hydrogen release and recharge cycles. These phases must nucleate and react with each other across solid-solid phase boundaries leading to energy barriers that slow the rates of hydrogen exchange.

The kinetic barriers in boron-based hydrogen storage systems originate in part from the chemical bond transformations that occur during hydrogen cycling. Bonding in boron compounds is often covalent or ionic, both of which are directional. Thus, the energetic barriers associated with off-directional intermediate states in the chemical transformations of boron are high. It is likely that these high barriers slow atom diffusion and therefore the rates of hydrogen reaction. In addition, the high chemical valency of boron results in reactions with large boron atom rearrangements. For example, reversible hydrogen storage in borohydrides span stoichiometries from fully hydrogenated $[BH_4]_-$ anions with isolated boron atoms surrounded by and bound only to hydrogen to dehydrogenated networks of boron atoms bound mainly to each other. Such large changes result in multiple solid phases requiring diffusion of directionally bonded atoms. This gives rise to additional energetic barriers associated with nucleation of new phases and interfaces between phases. These barriers contribute to the slow kinetics of current boron-based hydrogen storage materials.

The slow kinetics of covalently bound hydrogen storage systems have been improved by using scaffolds to reduce particle sizes to the nanometer scale and thereby limit diffusion lengths. Significant increases in hydrogen exchange rates have been demonstrated, although this approach is limited because the energy barriers for individual diffusion events, the extent of atomic rearrangement, and interfacial energies between phases are all largely unchanged. There are also about 25% gravimetric and volumetric storage density penalties associated with using even the best possible scaffolds. To achieve the hydrogen exchange rates needed for practical applications, and to eliminate the storage density penalties, further improvements are needed.

Boron-based hydrogen storage materials have the potential to meet the density requirements given boron's low atomic weight, high chemical valance, and versatile chemistry. However, presenting a persistent challenge, the rates of hydrogen exchange in conventional boron based compounds are, thus far, too slow for practical applications.

SUMMARY

In an embodiment, a process for making a mixed-metal ternary boride/borohydride hydrogen storage material, includes the steps of: mixing an $M^a$ metal source, an $M^b$ metal source, and a borane adduct in hydrocarbon solvent; wherein $M^a$ is one or more metals selected from the group consisting of Li, Na, K, Mg, and Ca, and $M^b$ is one or more metals selected from Ti, V, Cr, Mn, Fe, Co, Ni, Cu and Zn; and removing excess solvent and liquid by-products by drying and applying a vacuum.

In an embodiment, a mixed-metal hydrogen-storage material includes: an isomorphic crystalline solid corresponding to formula (1) in a hydrogenated state:

$$M^a M^b (BH_4)_x \qquad (1)$$

wherein $M^a$ is a metal selected from the group consisting of Li, Na, K, Mg, and Ca; $M^b$ is a metal selected from Ti, V, Cr, Mn, Fe, Co, Ni, Cu and Zn, and x is 1 to 6, inclusive; and the isomorphic crystalline solid is essentially free of phase segregation.

In an embodiment, a method of cycling a mixed-metal hydrogen-storage material, the method includes the steps of: charging hydrogen to a mixed-metal ternary boride material to form a mixed-metal borohydride structure in a hydrogenated state; discharging hydrogen from the mixed-metal borohydride structure to form the mixed-metal ternary boride in a dehydrogenated state;
wherein the temperature in the charging, discharging or charging and discharging steps is 50° C. to 500° C.; and the mixed metal borohydride corresponds to formula (1):

(1)

wherein $M^a$ is a metal selected from the group consisting of Li, Na, K, Mg, and Ca, $M^b$ is a metal selected from Ti, V, Cr, Mn, Fe, Co, Ni, Cu and Zn, and x is 1 to 6, inclusive.

The above description presents a simplified summary in order to provide a basic understanding of some aspects of the systems and/or methods discussed herein. This summary is not a comprehensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Disclosed herein is a method and a system of obtaining solid-state hydrogen storage and release in materials with loaded hydrogen densities of 11 wt % or greater or 80 g/L or greater that can deliver hydrogen and be recharged at moderate temperatures and pressures enabling incorporation into hydrogen storage systems suitable for transportation and stationary applications. These materials include ternary boride materials comprising certain light transition metals and alkaline or alkaline earth metals, and ideally have no or very little phase separation.

Borohydrides of alkaline and alkaline earth metals display a high hydrogen content; however their decomposition temperatures are rather high. In contrast, most of transition metal borohydrides, especially those of 3d metals, are thermally unstable. Here a new approach to synthesizing borohydrides containing both transition metals and the alkaline or alkaline earth metals is disclosed. More specifically, the method comprises hydrogenating a single-phase ternary boride $M^aM^bB_x$ material, wherein $M^a$ is an alkali or alkaline earth metal selected from one or more of Li, Na, K, Mg, and Ca; and $M^b$ is a 3d transition metal selected from one or more of Ti, V, Cr, Mn, Fe, Co, Ni, Cu and Zn, and forming a composite solid-state material with little or no phase segregation, e.g., less than 1% phase segregation.

A few mixed-metal borohydrides are known, but they phase segregate upon hydrogenation/dehydrogenation cycling. For example, main group/transition metal borohydrides such as $LiSc(BH_4)_4$, $Na_2Mn(BH_4)_4$, and $LiZn_2(BH_4)_5$, dehydrogenate to form phase segregated LiH or NaH and the corresponding transition metals or metal borides. In contrast to those materials, the materials disclosed herein can suppress phase segregation by selecting metal ions $M^a$ and $M^b$ so that isostructural borides and/or borohydrides are formed, where $M^b$ also functions to destabilize or tune thermodynamic properties within a single phase. The maintaining of single material phases permits hydrogenation/dehydrogenation cycling while suppressing phase segregation, promoting hydrogen storage with more controlled chemistry and morphologies as well as faster reaction kinetics.

Moreover, the intrinsic limitations in boron-metallic systems of high diffusion barriers and interfacial energy barriers discussed above, are addressed by systems with minimal, preferably single, hydrogenated and dehydrogenated phases. For boron-based materials, ternary borides $M^aM^bB_x$ that hydrogenate to single phase mixed-metal borohydrides $M^aM^b(BH_4)_x$ via the reaction (I) satisfy this criteria.

(I)

Depending on the choice of metals $M^a$ and $M^b$, high hydrogen capacities (11 wt % $H_2$ or greater) can be achieved, thermodynamics can be improved, and the storage material can potentially act catalytically.

Figure 1:
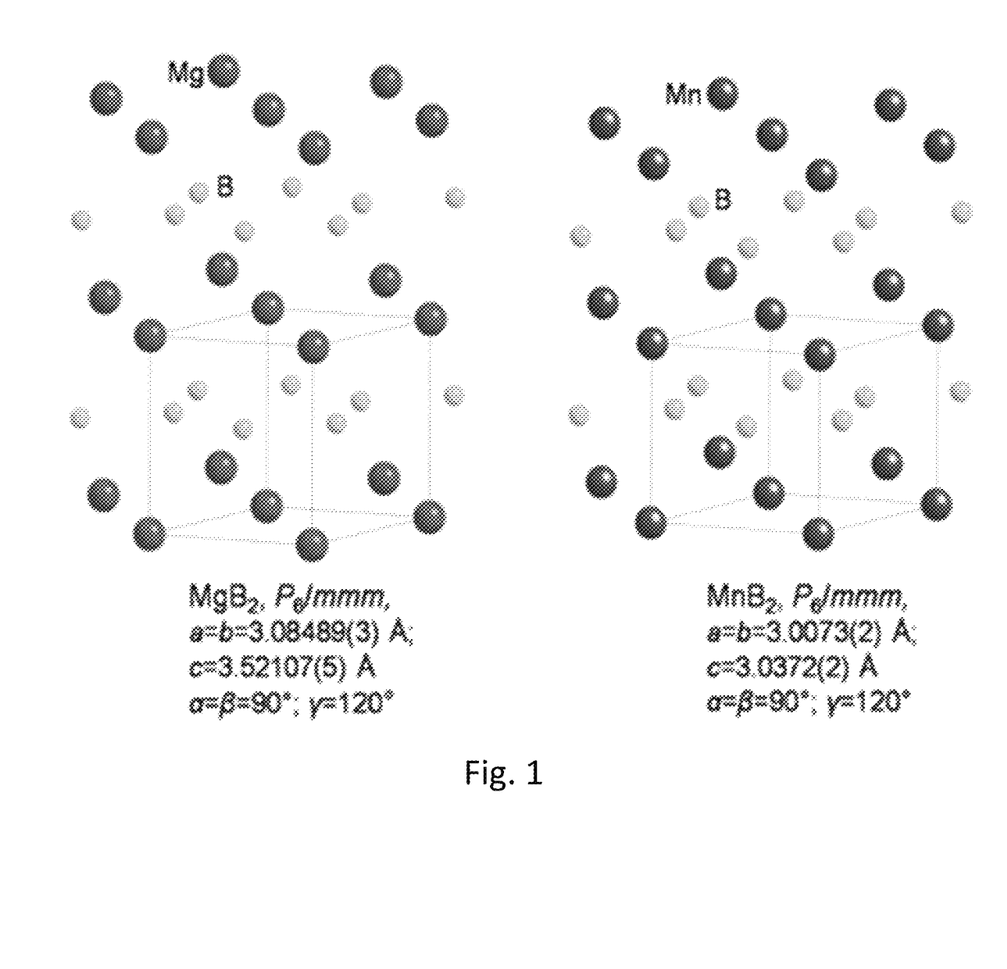
FIG. 1 is a diagram showing isomorphic crystalline structures of boron-magnesium and boron-manganese compounds.

Ternary borides and mixed metal borohydrides based on Mg (as $M^a$) with the first row transition metals V, Cr, Mn, Fe, and Co (as $M^b$) were explored as disclosed herein. Magnesium forms a hexagonal binary boride ($MgB_2$, P6/mmm). The transition metals V, Cr, Mn, Fe, and Co also form hexagonal borides isostructural with $MgB_2$ (FIG. 1). This suggests that hexagonal single-phase ternary borides of these transition metals with Mg are formed. In addition, the varying Pauling electronegativities (Table 1) enable tuning of the stability of the material using the established inverse relationship, i.e., increasing average electronegativity decreases borohydride stability. Thus, using $M^a$=Mg and $M^b$=V, Cr, Mn, Fe or Co, gives five new hydrogen storage reaction systems that all have gravimetric hydrogen storage densities >11 wt %. Metal electronegativity and borohydride gravimetric hydrogen density for Mg and selected transition metals are shown in Table 1. Other species of $M^a$ disclosed herein, (other than just Mg) are also believed to be operable in combination with $M^b$ so long as phase segregation is controlled by appropriate selection of an isostructural $M^b$ and proper synthesis.

TABLE 1

| Metal ($M^b$) | Mg | Mn | V | Cr | Fe | Co |
|---|---|---|---|---|---|---|
| $\chi_P$ | 1.31 | 1.55 | 1.63 | 1.66 | 1.83 | 1.88 |
| wt % H, $Mg^a M^b(BH_4)_x$ | 14.9 | 11.6 | 12.0 | 11.9 | 11.6 | 11.3 |

In embodiments, $M^a$ and $M^b$ are selected to comprise matched pairs of ternary borides and mixed-metal borohydrides that can exchange hydrogen with only one hydrogenated phase (the ternary borohydride) and only one dehydrogenated phase (the ternary boride).

In the Examples below, pairs of ternary borides and mixed-metal borohydrides based on Mg with various first row transition metals were investigated experimentally. In particular, the Mg/Mn ternary boride and associated ternary borohydride were found to be a particularly suitable pair and synthesized using novel synthetic approaches. Dehydrogenation of the Mg/Mn ternary borohydride with a capacity of about 8 wt % was shown to begin at 170° C., which is about 100° C. lower than the temperature for pure magnesium borohydride. Similarly, significantly more hydrogen uptake was demonstrated in the Mg/Mn ternary boride compared to pure magnesium boride, with faster kinetics for the uptake.

In an embodiment, a ternary hydrogen-storage material includes an isomorphic crystalline solid corresponding to formula (1) in a hydrogenated state:

$$M^a M^b (BH_4)_x \qquad (1)$$

wherein x is 1 to 6, inclusive.
In a dehydrogenated state the hydrogen-storage material corresponds to the ternary boride of formula 2:

$$M^a M^b B_x \qquad (2)$$

wherein x is 1 to 6, inclusive.

$M^a$ is one or more metals selected from the group consisting of Li, Na, K, Mg, and Ca. $M^b$ is one or more metals selected from Ti, V, Cr, Mn, Fe, Co, Ni, Cu and Zn. X is 1 to 6, inclusive, in embodiments it may range from 2 to 5, inclusive, or 3 to 4 inclusive. The metals $M^a$ and $M^b$ are selected to form isomorphic metal boride crystalline structures. Any isomorphic crystalline structures are compatible with this concept. In particular, cubic (including simple cubic, body centered cubic, and face centered cubic), orthorhombic, tetragonal, or hexagonal structures are preferred in some embodiments. The metals are also chosen for similarity in ionic radii such that the structures of the borides and borohydrides are similar, thus preventing phase segregation. Ideally, both the hydrogenated and dehydrogenated states are single phase, although in an embodiment, at least one is single phase.

The isomorphic crystalline solid is in a single phase meaning it is essentially free of phase segregation, in one or both of the hydrogenated and dehydrogenated states. This is determined through XRD as disclosed in the examples herein. The XRD pattern of a composition that is essentially free of phase segregation has a well defined set of peaks and integration of peaks attributed to a different phase that is 1% or less of the total peak area for those peaks attributed to the single dominant phase. The absence of phase segregation is believed to be a factor in improved hydrogen cycling reaction kinetics.

The ratio of $M^a$ and $M^b$ can be varied. In an embodiment, the ratio of $M^a$ to $M^b$ is 1:1.1 to 1:0.05, such as 1:1 to 1:0.1, or 1:0.75 to 1:0.25.

Characteristics of the hydrogen storage material can be modified by varying its electronegativity. Table 1 above shows the electronegativity of certain $M^a$ or $M^b$ elements, ranging from 1.3 to 1.9. In particular, the introduction of a transition metal $M^b$ with a larger electronegativity into the ternary boride $M^a M^b B_x$, should facilitate hydrogen molecule splitting and enabling diffusion during ternary boride hydrogenation.

In an embodiment, the hydrogen storage composition also includes a catalytic amount of one or more catalytic additives such as potassium compounds to improve the kinetics of both dehydrogenation and rehydrogenation. For example, a catalytic amount, may be about 0.01 to 5 mole percent, such as 0.1 to 3 mol percent, or 1.5 to 3.5 mol percent.

In an embodiment, one or more catalysts may be selected from titanium trichloride, titanium tetrachloride, titanium hydride, potassium hydride, potassium fluoride, potassium chloride, nickel, nickel chloride and combinations thereof. Further, the catalyst can include other materials such as, but not limited to, aluminum, aluminum hydride, $AlCl_3$, $MnCl_2$, $TiCl_3$, $TiF_3$, $FeCl_2$, $CoCl_2$ and combinations thereof. By incorporating catalysts in the storage material, a higher hydrogen storage capacity can be achieved. It is anticipated that these catalysts are present in such small amounts that they do not affect the isomorphic crystalline structure or the ternary metal borides and ternary metal borohydrides, which are so designed as to prevent undesired phase segregation.

Although other additives or catalysts may be present, in embodiments the hydrogen storage compositions of the present invention predominantly (essentially) consist of the above-mentioned ternary materials $M^a M^b B_x$ and $M^a M^b (BH_4)_x$.

Preparation methods for ternary metal borides can be classified into several groups: 1) direct reaction of the elements; 2) borothermic reduction; 3) carbothermic reduction; 4) electrochemical reduction in molten salt electrolytes; and 5) molecular precursor decomposition. In addition, a new method involving a direct alloying reaction of $MgB_2$ with a transition metal or a transition metal boride may be advantageously used herein to make the mixed metal compounds.

Two synthetic approaches to the mixed-metal ternary boride systems are demonstrated in the examples below: i) synthesis of main group-transition metal ternary borides followed by hydrogenation into the corresponding single-phase mixed-metal borohydride species and (ii) direct synthesis of mixed-metal borohydrides followed by their dehydrogenation into a single ternary boride phase. Dehydrogenation of alkali and alkaline-earth borohydrides often leads to the formation of kinetically stable polyboron anion clusters, such as $[B_{12}H_{12}]^{2-}$, that can limit reversibility. The advantage of the new direct synthesis method for storing hydrogen is that ternary transition metal borohydrides dehydrogenate directly into ternary borides without formation of polyboron anions avoiding reaction paths leading to unwanted stable intermediates and enabling reversibility under milder conditions of temperature and hydrogen pressure. In an embodiment, the mixed-metal borohydride product of the dehydrogenation reaction is essentially free of polyboron anions, such as containing less than 0.1% by weight of the compound, less than 0.01%, or less than 0.001%.

In an embodiment of the process, a process for making a mixed-metal borohydride hydrogen storage material, includes the steps of mixing a first metal source ($M^a$ metal source), a second metal source ($M^b$ metal source), and a borane adduct in hydrocarbon solvent. After mixing, excess solvent and liquid by-products are removed under vacuum and gentle heating. The solid product is then dried.

$M^a$ and $M^b$ are selected as described above, i.e., $M^a$ is one or more metals selected from the group consisting of Li, Na, K, Mg, and Ca, and $M^b$ is one or more metals selected from Ti, V, Cr, Mn, Fe, Co, Ni, Cu and Zn. The first and second metal sources may be, for example, the respective metals bonded to one or more alkyl groups, such as, for example, one or more linear or branched, $C_2$ to $C_{26}$ alkyl groups, such as $C_3$ to $C_{12}$, or $C_4$ to $C_8$ alkyl groups. Alternatively, the metal sources may be other counterions that dissociate in solvent and are removable from the final product.

The borane adduct is a boron containing material that serves as a source for boron that will bond with the $M^a$ and $M^b$ metals. In an embodiment, the borane adduct is borane-dimethylsulfide adduct. Other compounds, such as diborane or borane etherates (where ether is diethylether, tetrahydrofurane, dioxane) can be also used for these purposes.

The solvent may be a hydrocarbon solvent, such as, for example, liquid hydrocarbons comprising $C_2$ to $C_{26}$ groups, such as $C_3$ to $C_{12}$, or $C_4$ to $C_8$ alkyl groups, as well as aryl derivatives, such as phenyl or benzyl groups. In an embodiment, the solvent is n-heptane.

All handling involving the metal borohydrides is done under inert atmosphere with, for example, argon gas. Recovery of the mixed-metal borohydride storage material from the solvent is done with care to avoid high heating and is performed under vacuum. Mild temperatures are used, and include applying heat to ramp the temperature from room temperature (about 20° C.) to 120° C., such as a maximum of 40° C. to 100° C., or 45° C. to 85° C. The product is kept under a vacuum until the solvents and liquid by-products have evaporated or otherwise been removed and the product is dried. Vacuum pressure at 20° C., may, for example, be 0.001 to 0.5 atm, such as 0.01 to 0.1 atm, or 0.02 to 0.2 atm. The vacuum pressure is measured inside a sealed chamber where the reaction takes place. Other methods of removal of the supernatant may also be used, such as filtration including vacuum filtration, or decanting.

The catalysts or dopants mentioned above can be incorporated in the material by adding the catalyst to the solution along with the boron adduct. This allows for a one-pot synthesis of a catalyzed mixed-metal borohydride hydrogen storage material.

The synthesized nanoconfined materials can be pelletized, compacted, or formed into a suitable form for incorporation into a hydrogen storage vessel.

In an embodiment, a method of cycling the mixed-metal ternary hydrogen-storage material comprises the steps of: charging hydrogen to a mixed-metal ternary boride material to form a mixed-metal ternary borohydride structure in the hydrogenated state; discharging hydrogen from the mixed-metal ternary borohydride structure to form the mixed-metal ternary boride in the dehydrogenated state.

The ternary hydrogen-storage material corresponds to formula (1) in the hydrogenated state and formula (2) in the dehydrogenated state as disclosed above. The cycling reaction also corresponds to reaction (I).

In the hydrogenated state the borohydride material can contain over 11 wt % hydrogen, such as 11.5 to 18%, or 12 to 15% hydrogen based on the total weight of the composition, such as Table 1. It is desired that 100% of the hydrogen is released, but in an embodiment, of the method using the materials disclosed herein at least 60% by weight of the total hydrogen stored in the mixed-metal borohydride material is discharged during the discharge cycle, such as 75% to 99.99%, or 90% to 99%.

The charged and discharged states can be reached with reaction temperatures ranging from 50° C. to 500° C., 100° C. to 400° C., or 250° C. to 315° C. but, more typically, at lower temperatures for hydrogen storage materials, such as 150° C. to 380° C., or 180° C. to 350° C. Charging pressure may range, for example, from 50 bar to 700 bar, such as 100 bar to 350 bar, or 150 bar to 200 bar $H_2$.

The kinetics of the hydrogen cycling were significantly improved for cycling the mixed-metal borohydride materials disclosed herein compared to a non-mixed metal. For example, in the hydrogen release cycle, the hydrogen storage materials disclosed herein may release half of the hydrogen desorption capacity in 3 hours or less, such as 30 to 90 minutes, or 60 minutes to 150 minutes at 100 bar and 300° C.

In certain fuel cell applications, lower pressure and temperature discharge conditions are highly desirable, such as in fuel cell electric vehicles. In embodiments of the ternary borohydride materials disclosed herein, the discharge reaction can proceed at temperatures and pressures suitable for such applications, such as, for example, 80° C. to 120° C., or 85° C. to 100° C., or 90° C. to 105° C., and at 40 to 150 bar, such as 50 to 100 bar, or 60 to 80 bar.

An exemplary application of the systems disclosed herein is to store hydrogen, reversibly or in a single discharge application, although other uses are not excluded. Other uses, for example, are thermal energy storage systems, in which the mixed-metal borohydride material is used to reversibly store heat. Solar energy can also be used to decompose the mixed-metal material to release gaseous $H_2$; the mixed-metal borohydride material is then regenerated via the (exothermic) reaction of the mixed-metal borohydride with $H_2$ at night. The hydrogen storage material may also be used in a single hydrogen discharge application, such as, for example, rapid inflation devices.

In an embodiment, the reversible hydrogen storage composition can be packaged in a tank for subsequent use in a fuel cell using standard methods and systems. For example, the composition can be filled into a modular container having a gas outlet and a hydrogen inlet for refilling/recharging and a component for thermal control of the hydrogen storage material.

Discharging the system, to provide the hydrogen needed for hydrogen-based clean energy, can be performed at moderate temperatures and pressures as disclosed herein. This allows the system to be potentially used in a fuel cell for powering applications such as electric vehicles.

EXAMPLES

The following section, describes a detailed example of synthesis and characterization of a mixed-metal borohydride material using the novel and mild methods disclosed herein, producing a hydrogen storage material with improved properties.

Example 1: Synthesis of Mg/Mn Ternary Metal Borides by Milling

Initially, phase pure $MgB_2$ was synthesized by reaction of (excess) elemental Mg and B at 680° C. in a sealed stainless steel container under argon atmosphere.

Figure 2:
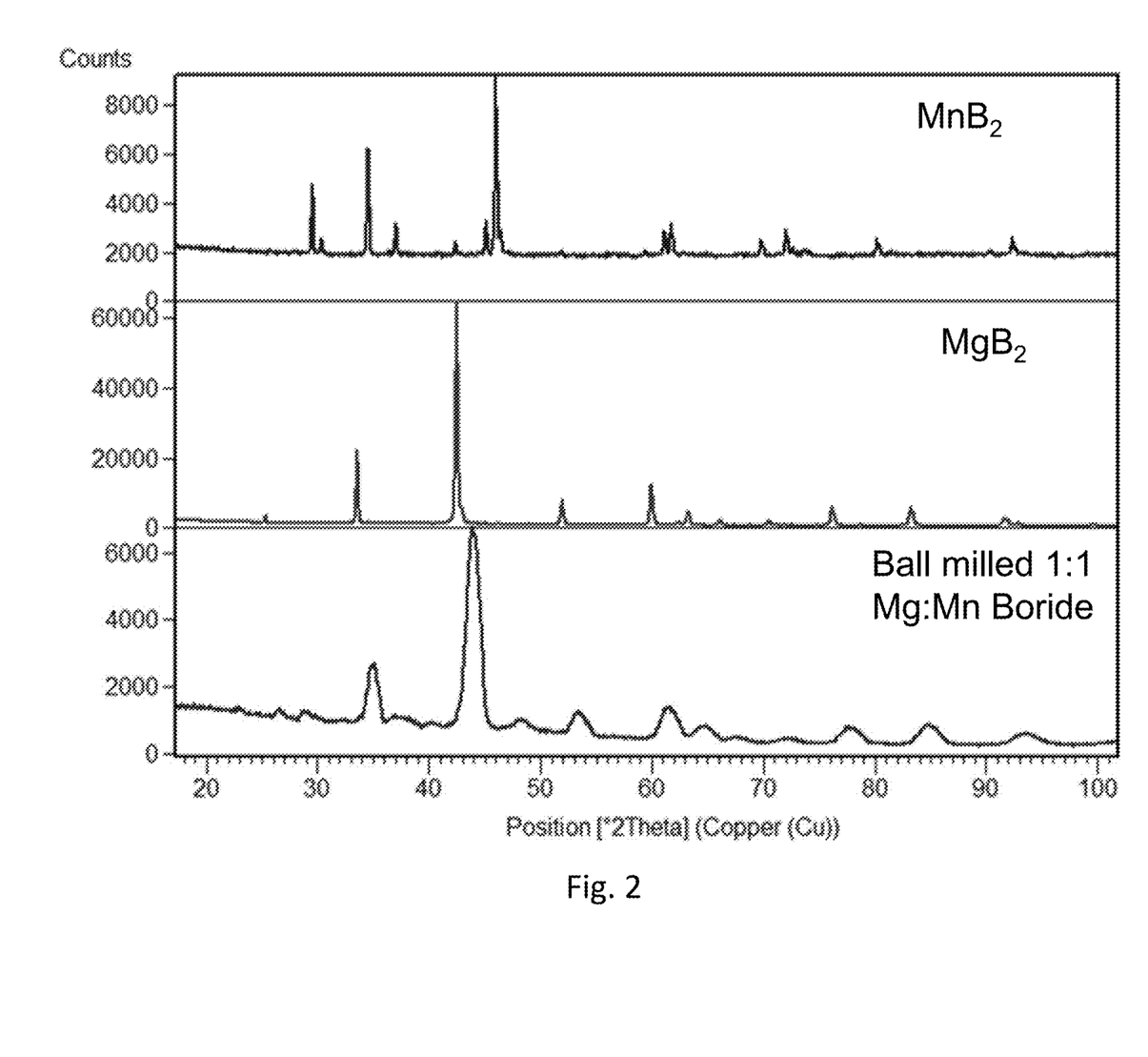
FIG. 2 shows XRD patterns for $MnB_2$, $MgB_2$ and the ternary boride $Mg_{0.5}Mn_{0.5}B_2$ produced by ball milling together $MnB_2$ and $MgB_2$ in 1:1 ratio.

Using the synthesized $MgB_2$, a direct alloying reaction with Mn was used to synthesize the Mg/Mn ternary metal boride. Commercial $MnB_2$ was milled together with the $MgB_2$ in a 1:1 molar ratio. Milling was conducted in a SPEX 8000 mill for 16 hr at room temperature with hardened steel balls. The results are shown in FIG. 2. The top panel shows that the commercial $MnB_2$ contains $Mn_3B_4$ as an impurity phase. The symmetry of the $MnB_2$ component can still be recognized as identical to $MgB_2$, as shown in comparing the top panel with the XRD spectrum of $MgB_2$ in the middle panel. The XRD of the Mg/Mn ternary boride is shown in the bottom panel. The diffraction peaks are broadened, as expected for a metal material that has reduced crystallite size produced by ball milling. In addition, the symmetry is retained indicating a single phase. The peaks for the Mg/Mn ternary boride are intermediate in diffraction angle between those of $MgB_2$ and $MnB_2$. This is most easily seen for the intense 101 peaks at about 45 degrees two-theta in the bottom panel XRD spectrum. This indicates formation of a $Mg_{0.5}Mn_{0.5}B_2$ ternary boride, and not just a physical mixture of $MnB_2$ and $MgB_2$.

To characterize the distribution of Mg and Mn in the product phase, energy dispersive x-ray spectroscopy (EDS) was performed (data not shown). At the resolution of the analysis (about 100 nm), the Mg and Mn appear well-mixed and stable.

Examples 2 and 3

In addition to $Mg_{0.5}Mn_{0.5}B_2$, ternary borides with the compositions of $Mg_{0.75}Mn_{0.25}B_2$ (Example 2) and $Mg_{0.9}Mn_{0.1}B_2$ (Example 3) were also synthesized by the same manner as Example 1. To check the thermal stability of $Mg_{0.75}Mn_{0.25}B_2$ and $Mg_{0.9}Mn_{0.1}B_2$ samples were annealed at 500° C. for 72 hr and characterized by XRD. The results are shown in FIG. 3.

Figure 3:
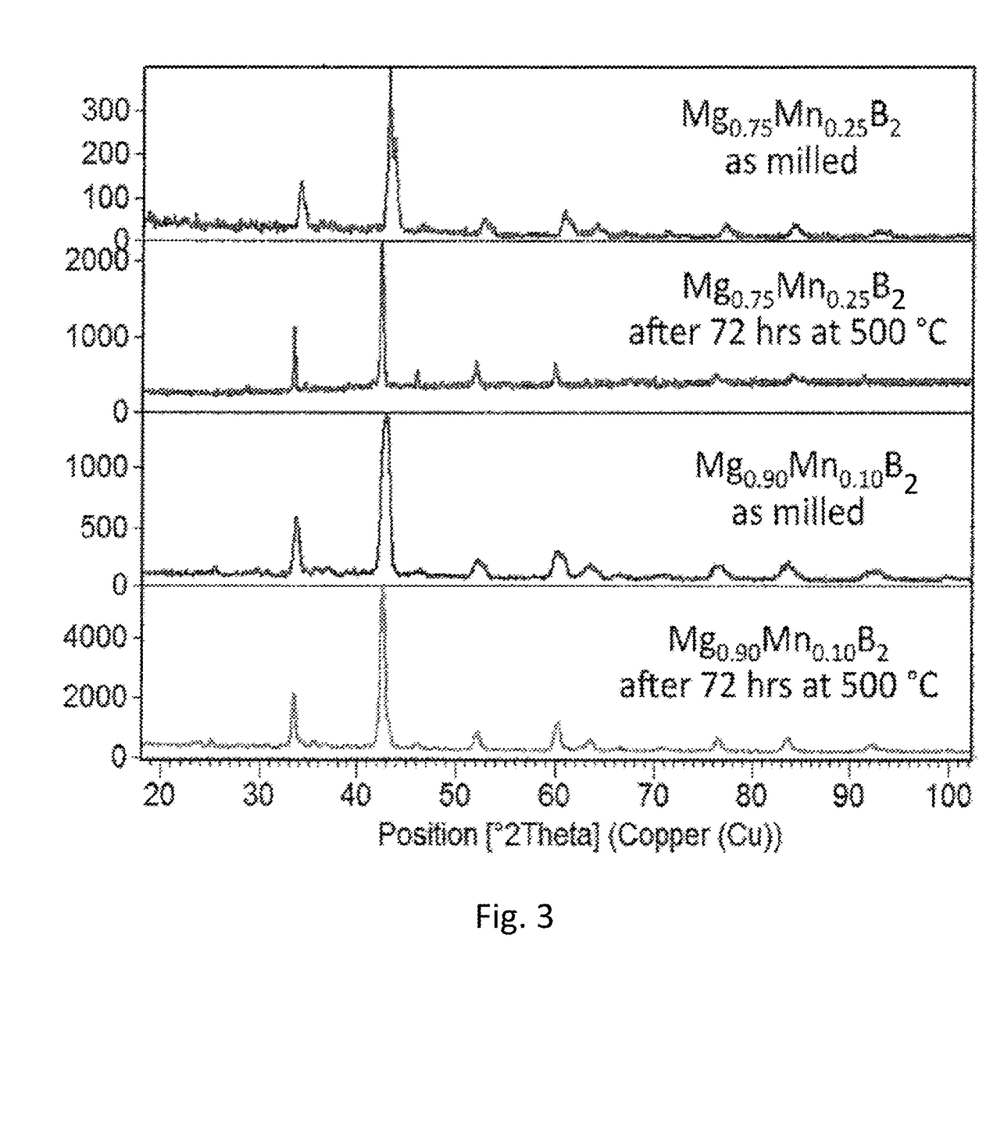
FIG. 3 is XRD data showing the results of thermal stability checks for $Mg_{0.75}Mn_{0.25}B_2$ and $Mg_{0.9}Mn_{0.1}B_2$ conducted by heating these materials to 500° C. for 72 hours.

XRD from the $Mg_{0.75}Mn_{0.25}B_2$ thermal test are shown as the top two panels in FIG. 3. After annealing, the $Mg_{0.75}Mn_{0.25}B_2$ sample XRD peak widths sharpen, as expected, but they also shift to slightly lower $2\theta$ angles closer to pure $MgB_2$ (see the middle panel of FIG. 2). Traces of peaks for $MnB_2$ also appear, e.g., at 46 degrees 2-$\theta$, although these peaks are not as apparent as the peaks for $MgB_2$. This change in the XRD spectra suggests a thermal instability, although it is at temperatures well above the about 380° C. temperatures for which hydrogen storage reactions are expected to occur. XRD for a $Mg_{0.9}Mn_{0.1}B_2$ sample thermal test are shown in the bottom two panels of FIG. 3. The change is much less apparent for the $Mg_{0.9}Mn_{0.1}B_2$ sample indicating this composition is a thermally stable solid solution.

Example 4 Hydrogen Adsorption of Mg/Mn Ternary Metal Borides

Figure 4:
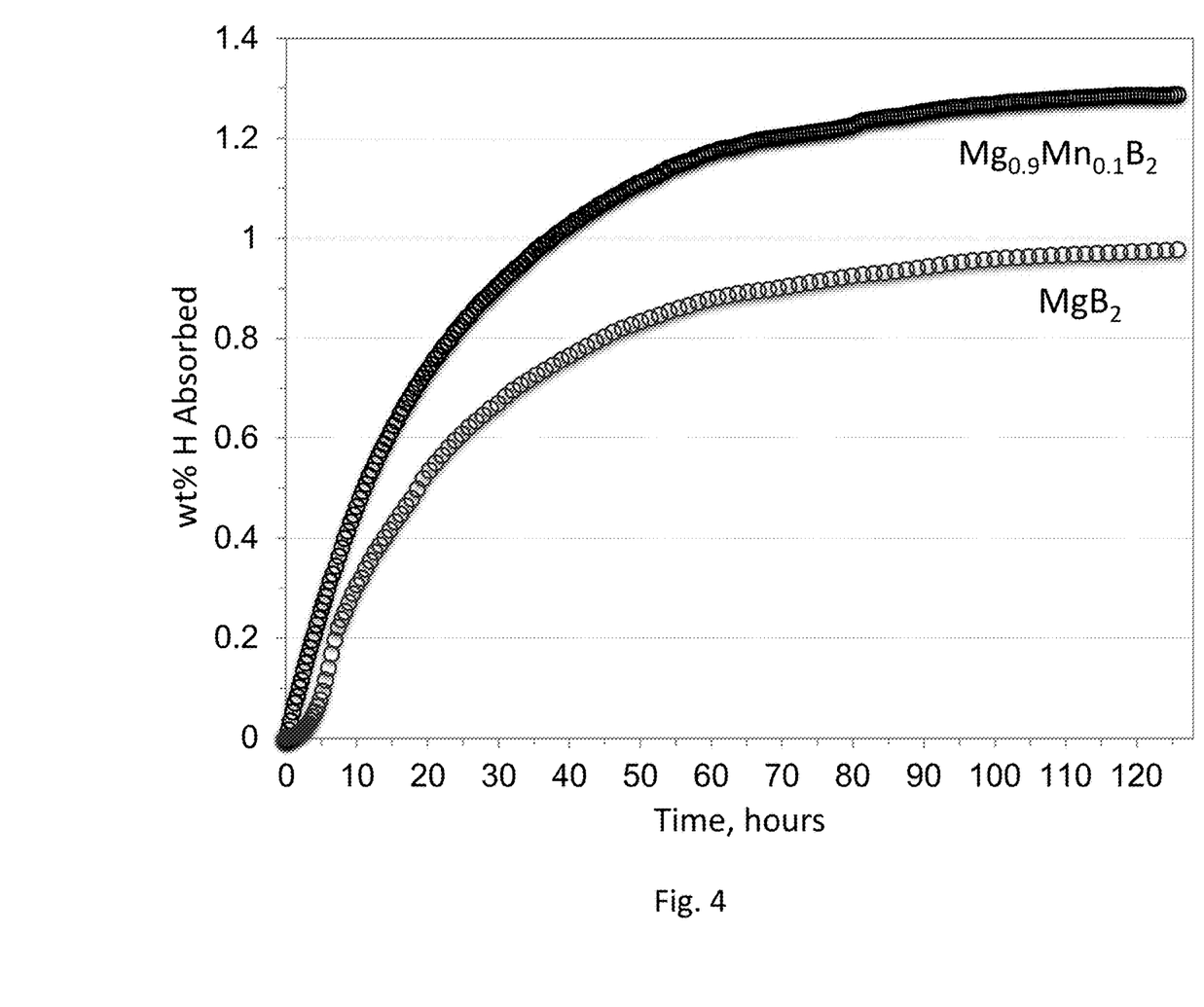
FIG. 4 shows results from Sieverts hydrogen uptake measurements for $MgB_2$ and the ternary boride $Mg_{0.9}Mn_{0.1}B_2$ showing the enhanced hydrogenation kinetics for the ternary boride.

The hydrogen cycling behavior of the Example 3 ($Mg_{0.9}Mn_{0.1}B_2$) compound was investigated, with the results shown in FIG. 4. The sample was hydrogenated in 150 bar of $H_2$ for 125 hr at 378° C. It is apparent that compared to pure $MgB_2$, the $Mg_{0.9}Mn_{0.1}B_2$ material hydrogenates more quickly. Indeed, whereas bulk $MgB_2$ takes about 120 hours to reach 0.98 wt. % H, the ternary borodide $Mg_{0.9}Mn_{0.1}B_2$ only requires 35 hours to reach the same level of hydrogenation.

Example 5: Hydrogen Desorption from Mg/Mn Ternary Borohydrides

Achieving a single phase hydrogen storage material was also investigated beginning with the mixed metal Mg/Mn borohydride. A common synthesis scheme was used to make the separate Mg and Mn borohydrides.

Example 6: Synthesis and Characterization of the Mixed-Metal Borohydrides $Mg_{1-x}Mn_x(BH_4)_2$ The $MgMn(BH_4)_4$ material with a nominal Mg:Mn ratio of 1:1 was isolated in pure form. The synthesis was performed using a new procedure which involves the reaction of a mixture of equimolar amounts of $Mg(n-Bu)_2$ and $Mn(n-Bu)_2$ with borane-dimethylsulfide adduct in heptane. The as-synthesized powder was dried by removing excess solvent and $Me_2S$ in vacuum upon mild heating.

The solvent and dimethylsulfide removal procedure with gentle heating greatly facilitates obtaining a pure material. Low temperature leads to a material which contains significant amounts of sulfur (according to elemental analysis), while heating in vacuum over 100° C. leads to partial decomposition of the material.

Figure 5:
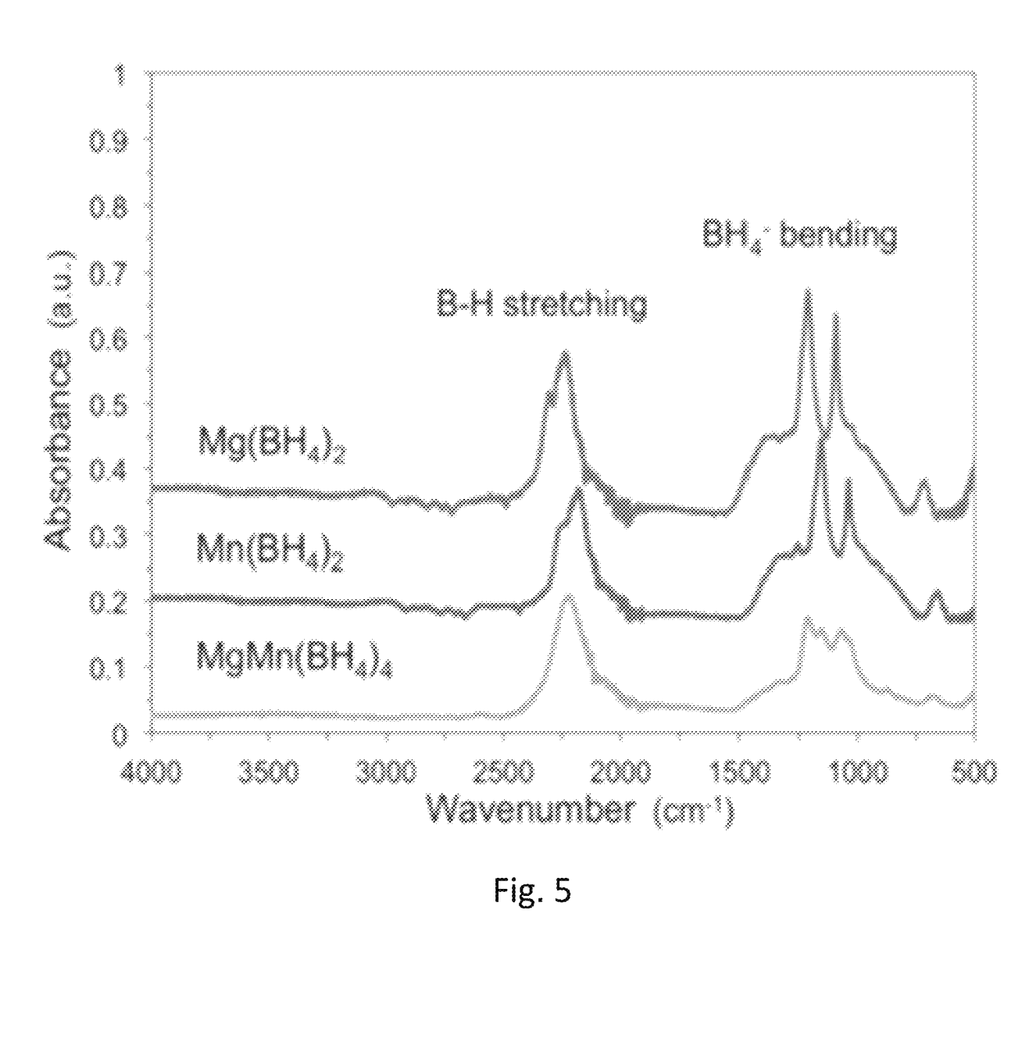
FIG. 5 is FTIR data for $Mg(BH_4)_2$, $Mn(BH_4)_2$ and the ternary borohydride $MgMn(BH_4)_4$.

The as-synthesized mixed-metal Mg—Mn borohydride was characterized by means elemental analysis and FTIR spectroscopy. The elemental analysis shows a boron content of 29.8% and a hydrogen content of 10.93% by weight, close to the calculated 31.19% and 11.63% for B and H in $MgMn(BH_4)_4$. The FTIR spectra of $Mg(BH_4)_2$, $Mn(BH_4)_2$ and the newly-synthesized $MgMn(BH_4)_4$ are shown in FIG. 5. The measurements were performed on an Agilent Cary-630 FTIR spectrometer in attenuated total reflectance (ATR) mode. In the spectral region analyzed (500-4000 $cm^{-1}$), there are both $BH_4$ bending (about 1000-1500 $cm^{-1}$) and B—H stretching modes (about 2000-2500 $cm^{-1}$). The position of the broad B—H stretching mode depends on the metal ion, with the band observed at 2285 $cm^{-1}$ for $Mg(BH_4)_2$, 2159 $cm^{-1}$ for $Mn(BH_4)_2$ and 2207 $cm^{-1}$ for $MgMn(BH_4)_4$. Note that the spectrum for $MgMn(BH_4)_4$ is different than that for a simple physical and unreacted mixture of $Mg(BH_4)_2$ and $Mn(BH_4)_2$, which could have resulted from the synthesis attempt.

Figure 6:
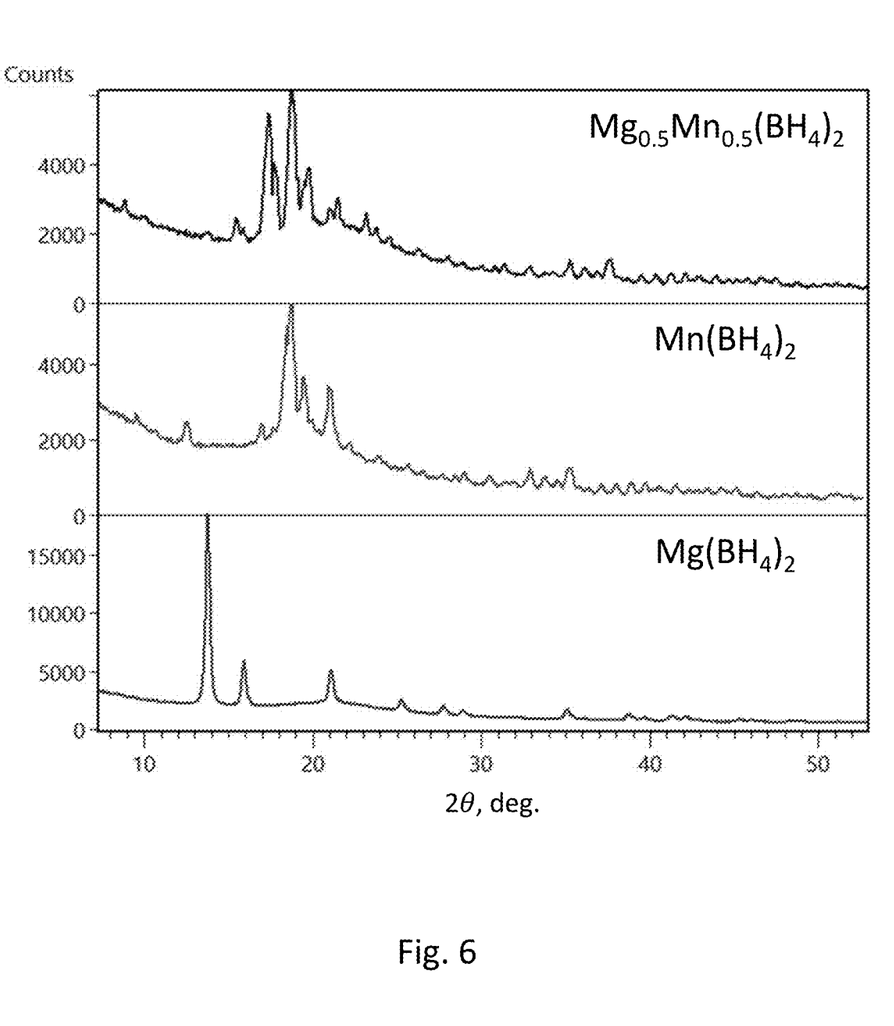
FIG. 6 is XRD data for the ternary borohydride $Mg_{0.5}Mn_{0.5}(BH_4)_2$ compared with XRD patterns for $Mg(BH_4)_2$ and $Mn(BH_4)_2$.
Figure 7:
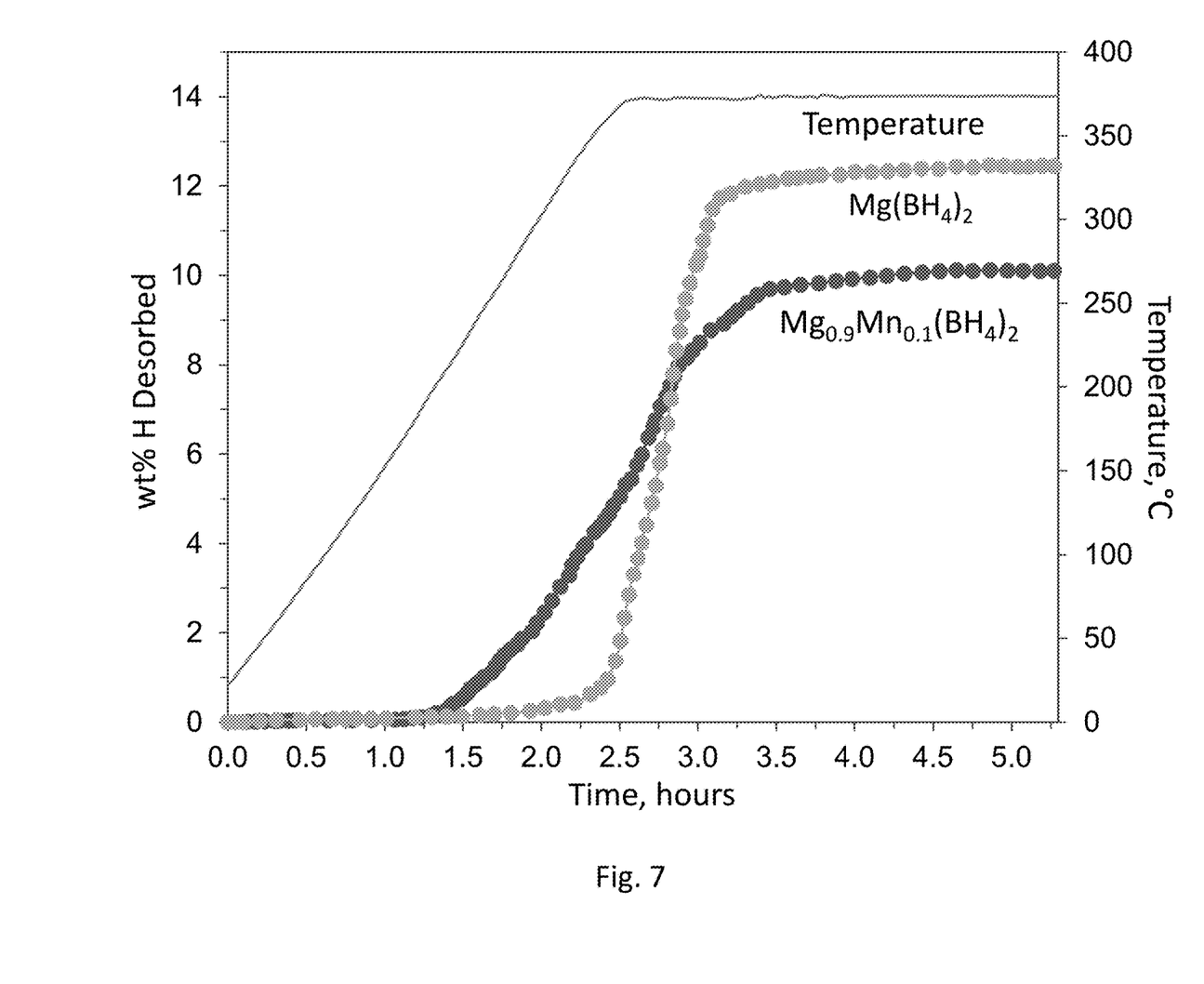
FIG. 7 shows Sieverts hydrogen thermal desorption traces for $Mg(BH_4)_2$ and $Mg_{0.9}Mn_{0.1}(BH_4)_2$ showing the enhanced hydrogen desorption kinetics of the ternary borohydride.

The Example 6 material with a 1:1 metal ratio was further characterized by x-ray diffraction (XRD). The XRD pattern of the solvent-free $MgMn(BH_4)_4$ and the experimental spectra for $Mg(BH_4)_2$ and $Mn(BH_4)_2$ are shown in FIG. 6. The XRD data comparison indicates a mixed-metal phase obtains for $MgMn(BH_4)_4$, and not a physical mixture of the two borohydride materials. The measurements were performed using an Empyrean X-ray diffractometer equipped with a PIXcel3D detector and operated at 45 kV and 40 kA using Cu K$\alpha$ radiation ($\lambda$=1.5418 Å). A mixed-metal borohydride $Mg_{1-x}Mn_x(BH_4)_2$ material with x=0.1 was also synthesized. The synthesis was also scaled to a level of about 1 gram in order to enable characterization of the $Mg_{0.9}Mn_{0.1}(BH_4)_2$ dehydrogenation behavior, as shown in FIG. 7 and described below.

Example 7: Hydrogen Desorption from Mg/Mn Borohydride

The as-synthesized, solvent-free $Mg_{0.9}Mn_{0.1}(BH_4)_2$ material was transferred into a stainless steel sample holder, which was subsequently attached to a Sieverts apparatus for dehydrogenation experiments. A thermocouple was placed in the center of the sample holder for accurate temperature measurements during the experiments. Pressure changes during the dehydrogenation and rehydrogenation of the samples were quantified with calibrated pressure transducers and recorded using a Lab View-based software program. During the dehydrogenation step the temperature was ramped from ambient to about 375° C., then maintained at this temperature for up to 5.5 hours (FIG. 7). It is clear from FIG. 7 that the Mg/Mn mixed borohydride $Mg_{0.9}Mn_{0.1}$ (BH$_4$)$_2$ starts to dehydrogenate after about 1.5 hours, at a ramp temperature of about 220° C., whereas pure Mg(BH$_4$)$_2$ starts to dehydrogenate at about 2.25 hours, at a temperature of about 340° C. Thus, the ternary borohydride has faster dehydrogenation kinetics.

Example 8: Phase Segregation Testing

Figure 8:
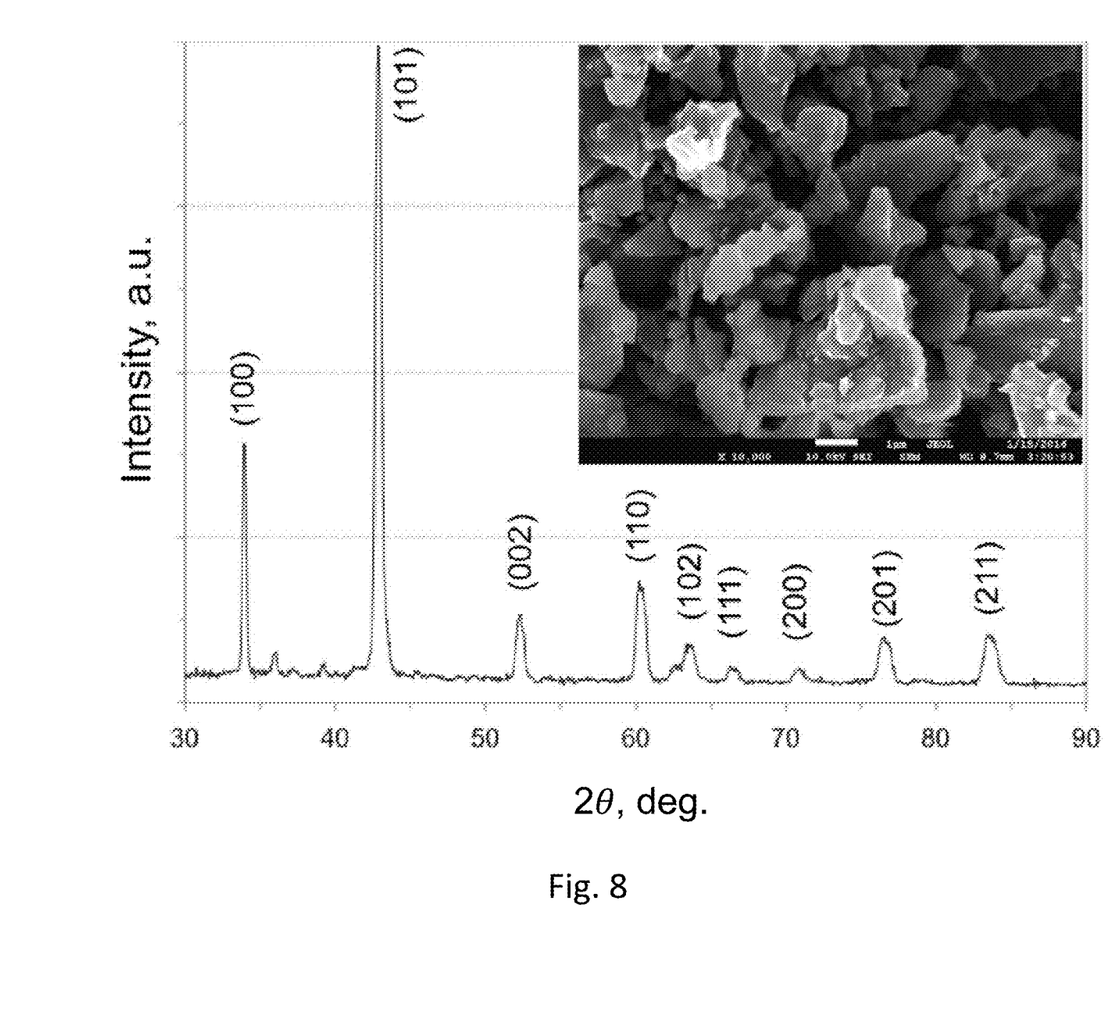
FIG. 8 shows an XRD pattern of the product of thermal decomposition of $Mg_{0.9}Mn_{0.1}(BH_4)_2$, along with an SEM image of the decomposition product.

To test whether single or multiple phases are formed upon thermal decomposition of Mg$_{0.9}$Mn$_{0.1}$(BH$_4$)$_2$ (of Example 3), this material was decomposed at 580° C. in an evacuated stainless steel vessel. The XRD pattern of the as-decomposed Mg$_{0.9}$Mn$_{0.1}$(BH$_4$)$_2$ material, shown in FIG. 8, confirms that the material displays d-spacing values characteristic to Mn-doped MgB$_2$ in P6/mmm, with some peak broadening due to alloying. The XRD data proves the single-phase nature of the material with no phase segregation. FIG. 8 also demonstrates that no detectable B$_{12}$H$_{12}$ or other polyboron species are produced in the thermal decomposition of the Mg$_{0.9}$Mn$_{0.1}$(BH$_4$)$_2$ material.

An SEM picture of the decomposed Mg$_{0.9}$Mn$_{0.1}$(BH$_4$)$_2$ material is also shown in FIG. 8. Energy-dispersive X-ray microscopy measurements from the microscopy (not shown) confirm that the as-decomposed Mg$_{0.9}$Mn$_{0.1}$(BH$_4$)$_2$ material is composed mainly of Mn, Mg, and B. The microscopy data coupled with the XRD results indicate that the 9:1 Mg:Mn borohydride decomposes into a single ternary boride material, as opposed to two phases that would result from undesired creation of MgB$_2$ and MnB$_2$. Thus, the Example 3 composition was essentially free of phase separation.

In summary, the introduction of a transition metal $M^b$ with a larger electronegativity to form the ternary boride $M^aM^bB_x$ decreases the kinetic barriers by facilitating hydrogen molecule splitting and enabling diffusion during ternary boride hydrogenation. This method introduces the concept of intramolecular destabilization in mixed-metal borohydrides through compositional tuning of the metals $M^a$ and $M^b$. Additionally, at the same time the $M^aM^b$(BH$_4$)$_x$ $\longleftrightarrow$ $M^aM^bB_x$+2(H$_2$)$_x$ reaction system is limited to a single hydrogenated and dehydrogenated phase, eliminating phase segregation and promoting reaction kinetics.

The direct synthesis method of making the mixed-metal ternary borohydrides followed by their dehydrogenation into a ternary boride phase has the advantage of storing hydrogen and dehydrogenating directly into ternary borides without formation of polyboron anions, which avoids reaction paths leading to unwanted stable intermediates and enabling reversibility under milder conditions of temperature and hydrogen pressure.

The term "consisting essentially" as used herein means the specified materials or steps and those that do not materially affect the basic and novel characteristics of the material or method. Here those characteristics are set forth herein and include, hydrogen storage capacity with light metals, and the ability to use less extreme temperature and pressure conditions in using the hydrogen storage material. The term "essentially free" as used herein means free of or free, except for trace amounts of the specified material.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A process for making a mixed-metal ternary boride/borohydride hydrogen storage material, comprising the steps of:
   mixing an $M^a$ metal source, an $M^b$ metal source, and a borane adduct in hydrocarbon solvent;
   wherein $M^a$ is one or more metals selected from the group consisting of Li, Na, K, Mg, and Ca, and $M^b$ is one or more metals selected from Ti, V, Cr, Mn, Fe, Co, Ni, Cu and Zn;
   removing excess solvent and liquid by-products by drying and applying a vacuum.

2. The process of claim 1, wherein the borane adduct in hydrocarbon solvent is borane-dimethyl sulfide adduct in heptane.

3. The process of claim 1, wherein the vacuum, measured at 20° C., is 0.001 to 0.1 atm.

4. The process of claim 1, wherein the $M^a$ metal source is an Mg alkyl and the $M^b$ metal source is an Mn alkyl or Co alkyl.

5. The process of claim 1, wherein the material is essentially free of phase segregation.

6. The process of claim 1, wherein the mixing step is performed with heating up to a maximum of 120° C.

7. The process of claim 1, further comprising dissolving a catalyst or dopant in the solvent.

8. A process for making a mixed-metal ternary boride/borohydride hydrogen storage material, comprising the steps of:
   reacting an $M^a$ metal source, an $M^b$ metal source, and a borane adduct, forming a mixed-metal borohydride;
   wherein $M^a$ is one or more metals selected from the group consisting of Li, Na, K, Mg, and Ca, and $M^b$ is one or more metals selected from Ti, V, Cr, Mn, Fe, Co, Ni, Cu and Zn;
   dehydrogenating the mixed metal borohydride into a ternary boride phase.

9. The process of claim 8, wherein the hydrogen storage is essentially free of phase segregation.

10. The process of claim 8, wherein $M^a$ is Mg and $M^b$ is Mn or Co.

* * * * *